(12) United States Patent
Park

(10) Patent No.: US 11,242,683 B2
(45) Date of Patent: Feb. 8, 2022

(54) REINFORCING BAR COUPLER

(71) Applicants: Oy Do Park, Changwon-si (KR); Jeil Wire Production Co., Ltd., Busan (KR)

(72) Inventor: Oy Do Park, Changwon-si (KR)

(73) Assignees: Jeil Wire Production Co., Ltd.; Oy Do Park

( * ) Notice: Subject to any disclaimer, the term of this patent is extended or adjusted under 35 U.S.C. 154(b) by 0 days.

(21) Appl. No.: 16/677,934

(22) Filed: Nov. 8, 2019

(65) Prior Publication Data

US 2020/0071932 A1    Mar. 5, 2020

Related U.S. Application Data

(63) Continuation of application No. PCT/KR2018/002099, filed on Feb. 21, 2018.

(30) Foreign Application Priority Data

Jun. 12, 2017 (KR) .................. 10-2017-0073259

(51) Int. Cl.
*E04C 5/16* (2006.01)
*E04B 1/58* (2006.01)

(52) U.S. Cl.
CPC ............... *E04C 5/165* (2013.01); *E04B 1/58* (2013.01); *E04B 2001/5887* (2013.01)

(58) Field of Classification Search
CPC .... E04C 5/165; E04B 1/58; E04B 2001/5887; F16B 7/04; F16B 7/0406

(Continued)

(56) References Cited

U.S. PATENT DOCUMENTS 45,476 A * 12/1864 Collins .................. F16G 11/04
                                                          403/314
65,183 A *  5/1867 Richards ................ F16G 11/04
                                                          403/314

(Continued)

FOREIGN PATENT DOCUMENTS

KR         200223729 Y1 *  5/2001
KR    10-2004-0024686 A    3/2004

(Continued)

OTHER PUBLICATIONS

Espace Translation "KR20050112967 (A)—Dec. 1, 2005" bundled with original document and KIPIRS translation supplied by applicant, under file name "KR20050112967A_TRANSLATION_BIB-DESC-CLM.pdf" (Year: 2020).*

(Continued)

*Primary Examiner* — Brian D Mattei
*Assistant Examiner* — Joseph J. Sadlon
(74) *Attorney, Agent, or Firm* — Park & Associates IP Law, P.C.

(57) ABSTRACT

A rebar coupler that includes a plurality of segments having the same shape and radially arranged, the segments being seated on outer surfaces of a pair of reinforcing bars with ends of the reinforcing bars simultaneously accommodated therein, a spacer configured to accommodate the segments therein and support them while spacing the segments at regular intervals, and a pair of sleeves configured to press the outer surfaces of the reinforcing bars against inner peripheral surfaces of the segments by allowing the segments to be close to each other when the sleeves approach each other.

9 Claims, 7 Drawing Sheets

(58) Field of Classification Search
USPC .......................................................... 52/309.1
See application file for complete search history.

(56) References Cited

U.S. PATENT DOCUMENTS

| | | | | |
|---|---|---|---|---|
| 106,673 | A * | 8/1870 | Zavala | H05B 7/14 |
| | | | | 403/296 |
| 378,540 | A * | 2/1888 | Brough | F16D 1/101 |
| | | | | 403/305 |
| 518,793 | A * | 4/1894 | Smith | E04C 5/165 |
| | | | | 403/305 |
| 889,776 | A * | 6/1908 | Dyer | F16D 1/101 |
| | | | | 403/305 |
| 911,854 | A * | 2/1909 | Upson et al. | E04C 5/165 |
| | | | | 403/305 |
| 968,382 | A * | 8/1910 | Meyers | F16B 7/0426 |
| | | | | 403/312 |
| 1,377,101 | A * | 5/1921 | John | F16D 1/05 |
| | | | | 403/313 |
| 3,079,186 | A * | 2/1963 | Williams | F16B 2/14 |
| | | | | 403/274 |
| 3,253,332 | A * | 5/1966 | Howlett | E04G 21/122 |
| | | | | 29/506 |
| 3,480,309 | A * | 11/1969 | Harris | F16B 7/0426 |
| | | | | 403/313 |
| 3,551,999 | A * | 1/1971 | Gutmann | F16B 17/004 |
| | | | | 29/517 |
| 3,552,787 | A * | 1/1971 | Yee | E04C 5/165 |
| | | | | 403/265 |
| RE27,954 | E * | 4/1974 | Kelly | E04C 5/122 |
| | | | | 403/369 |
| 3,863,891 | A * | 2/1975 | Leonte | E04C 5/122 |
| | | | | 254/29 A |
| 3,921,281 | A * | 11/1975 | Hattori | B21D 39/046 |
| | | | | 29/520 |
| 3,952,377 | A * | 4/1976 | Morell | E04C 5/122 |
| | | | | 24/136 R |
| 4,024,688 | A * | 5/1977 | Calini | E04C 5/165 |
| | | | | 52/378 |
| 4,223,497 | A * | 9/1980 | Edwards | E04C 5/12 |
| | | | | 403/284 |
| 4,388,014 | A * | 6/1983 | Wlodkowski | E04C 5/122 |
| | | | | 403/369 |
| 4,408,926 | A * | 10/1983 | Werner | F16B 2/14 |
| | | | | 403/300 |
| 4,441,837 | A * | 4/1984 | Mastroni | A63B 47/02 |
| | | | | 294/19.2 |
| 5,152,118 | A * | 10/1992 | Lancelot | E04C 5/125 |
| | | | | 52/848 |
| 5,193,932 | A * | 3/1993 | Wu | E04C 5/165 |
| | | | | 403/307 |
| 5,392,582 | A * | 2/1995 | Abukawa | E04C 5/165 |
| | | | | 403/265 |
| 5,746,555 | A * | 5/1998 | McEvoy | E04C 5/165 |
| | | | | 403/307 |
| 6,328,499 | B1 * | 12/2001 | Reding | E04C 5/125 |
| | | | | 403/299 |
| 6,655,104 | B2 * | 12/2003 | Kadotani | E04C 5/08 |
| | | | | 52/647 |
| 6,679,024 | B2 * | 1/2004 | Dahl | E04C 5/165 |
| | | | | 29/437 |
| 6,719,478 | B2 * | 4/2004 | Gregel | B25B 27/10 |
| | | | | 403/300 |
| 6,773,198 | B2 * | 8/2004 | Copping | E04C 5/165 |
| | | | | 403/292 |
| 6,860,672 | B2 * | 3/2005 | Kim | E04C 5/165 |
| | | | | 403/109.5 |
| 6,883,998 | B2 * | 4/2005 | Bullivant | E04C 5/07 |
| | | | | 403/300 |
| 7,093,402 | B2 * | 8/2006 | Hopwood | E04C 5/165 |
| | | | | 403/305 |
| 7,118,299 | B2 * | 10/2006 | Gregel | B25B 27/10 |
| | | | | 403/305 |
| 7,823,344 | B2 * | 11/2010 | Shin | E04C 5/122 |
| | | | | 52/223.13 |
| 9,062,457 | B2 * | 6/2015 | Gilling | E02D 5/74 |
| 9,663,963 | B2 * | 5/2017 | Berset | E04C 5/127 |
| 10,167,736 | B2 * | 1/2019 | James | F01D 25/265 |
| 10,352,046 | B2 * | 7/2019 | Prowse | E04B 1/215 |
| 10,385,569 | B2 * | 8/2019 | Yang | E04C 5/18 |
| 10,473,131 | B1 * | 11/2019 | Allen | F16L 1/123 |
| 10,589,362 | B2 * | 3/2020 | Shimmura | F16B 37/122 |

FOREIGN PATENT DOCUMENTS

| | | |
|---|---|---|
| KR | 10-0439305 B1 | 7/2004 |
| KR | 20-0356585 Y1 | 7/2004 |
| KR | 20-0359105 Y1 | 8/2004 |
| KR | 200359105 Y1 * | 8/2004 |
| KR | 10-2005-0112967 A | 12/2005 |
| KR | 20050112967 A * | 12/2005 |
| KR | 10-0650376 B1 | 11/2006 |
| KR | 10-2010-0009774 A | 1/2010 |
| KR | 10-2011-0017551 A | 2/2011 |
| KR | 10-1036594 B1 | 5/2011 |
| KR | 10-2016-0060070 A | 5/2016 |

OTHER PUBLICATIONS

Espace Translation "KR200359105 (Y1)—Aug. 16, 2004" bundled with original document and KIPIRS translation supplied by applicant, under file name "KR200359105Y1_TRANSLATION_BIB-DESC-CLM" (Year: 2020).*

Korean Office Action (KR 10-2017-0073259), KIPO, dated Sep. 27, 2017.

Korean Notice of Allowance (KR 10-2017-0073259), KIPO, dated Dec. 1, 2017.

International Search Report (PCT/KR2018/002099), WIPO, dated May 21, 2018.

* cited by examiner

REINFORCING BAR COUPLER

REFERENCE TO RELATED APPLICATIONS

This is a continuation of International Patent Application PCT/KR2018/002099 filed on Feb. 21, 2018, which designates the United States and claims priority of Korean Patent Application No. 10-2017-0073259 filed on Jun. 12, 2017 the entire contents of which are incorporated herein by reference.

FIELD OF THE INVENTION

The present invention relates to a rebar coupler that can be prevented from loosening against tensile stress and compressive stress as well as impact or vibration.

The present invention relates to a rebar coupler that includes a plurality of segments configured to have the same shape and size and generate a binding force by pressing an outer surface of a reinforcing bar, thereby achieving a reduction in manufacturing cost and facilitating maintenance and management.

The present invention relates to a rebar coupler that includes a spacer for allowing a plurality of segments to be radially spaced apart from each other, thereby enabling rebar connection to be more easily performed and working time to be significantly shortened.

The present invention relates to a rebar coupler capable of preventing a failure in fastening in advance by arranging a plurality of segments in a spiral form to minimize their deformation (bulging) when a sleeve is pressed thereagainst.

BACKGROUND OF THE INVENTION

A typical reinforced concrete structure is a structure that is constructed by integrating reinforcing bars and concrete to mutually complement their merits and demerits and by arranging the reinforcing bars at the portions where tensile stress acts to resist an external force.

That is, since the concrete is significantly low in resistance to tensile stress (i.e., tensile strength), compared to resistance to pressure stress (i.e., pressure intensity), it is cracked and destroyed even due to a slight tensile stress. Accordingly, the reinforced concrete structure is constructed such that the pressure stress acts on the concrete and the tensile stress acts on the reinforcing bars when an external force is applied to the structure, thereby improving durability.

Due to the enlargement and great height of reinforced concrete structures in recent years, the reinforcing bar inserted into concrete is relatively long, but the reinforcing bar is limitedly manufactured in length since it is a standard product fixed in length. Therefore, it is necessary to connect a plurality of reinforcing bars to each other according to the height of the structure.

Meanwhile, this connection is carried out by various methods such as lap joint for overlapping two reinforcing bars and then joining them in a bundle, gas pressure welding joint, and mechanical joint. However, it is dangerous to apply the lap joint to a high-rise structure since it is low in durability, and the gas pressure welding joint is not safe since it causes cracks due to thermal deformation of heated portions.

Accordingly, the mechanical joint has been mainly used in recent years since it ensures durability, which is disadvantageous for the lap joint and the gas pressure welding joint, and is easy to construct. As a representative example of the mechanical joint, there is a rebar coupler that has been considerably researched and developed and commercially available.

Hereinafter, a configuration of a conventional rebar coupler will be described with reference to FIG. 1.

FIG. 1 is a schematic view illustrating a configuration of a conventional rebar coupler.

As illustrated in the drawing, the rebar coupler, which is designated by reference numeral 1, has a substantially cylindrical shape, and the ends of a pair of reinforcing bars 5 are inserted into and screwed to the rebar coupler 1 through the left and right sides thereof.

To this end, the rebar coupler 1 has a conical fastening part 4 that is recessed therein while its inner diameter gradually decreases toward the center of the rebar coupler from the outside.

The fastening part 4 has a thread shape, and each of the reinforcing bars 5 has a male screw 6 machined at the end thereof and having a shape corresponding to the fastening part 4.

Thus, the reinforcing bars 5 can be interconnected by the rebar coupler 1 by inserting the reinforcing bars 5 into the rebar coupler 1 and then fastening the fastening part 4 to the male screw 6.

However, the rebar coupler 1 having the above configuration has the following problems.

That is, in order to connect the reinforcing bar 5 using the rebar coupler 1, the thread 6 should be machined on the end of each reinforcing bar 5, which may damage the reinforcing bar 5 and deteriorate the durability thereof.

Meanwhile, since the conventional rebar joint disclosed in Korean Patent Nos. 1036594 and 0650376 also includes a large number of parts, the cost of the rebar joint is increased, it takes a long time to connect, and it is difficult to manage materials due to the loss and damage of parts and the like.

Korean Patent Application Publication No. 10-2010-0009774 discloses a rebar coupler 7 configured such that a pair of reinforcing bars F are inserted from both sides thereof to be seated thereon, and then interconnected by a fastening member 8 inserted thereinto, as illustrated in FIG. 2.

However, since the reinforcing bars F are coupled with their centers offset from each other, the reinforcing bars may be twisted when an external force (tensile force or compressive force) is applied thereto.

Meanwhile, Korean Patent Application Publication No. 10-2004-0024686 discloses a rebar coupling device capable of screwing and assembling various reinforcing bars irrespective of the joint shapes thereof, as illustrated in FIG. 3.

However, the above related art discloses a structure in which a thread 111 is formed only on one of both ends of a pair of couplers 110 for fastening with a fastening nut 120.

Hence, since the couplers 110 are not screwed to the entire thread 122 on the inner peripheral surface of the fastening nut 120, but are screwed only in a semicircle, the coupling force thereof is deteriorated which may lead to separation of the fastening nut 120 in the event of external impact or vibration.

The reason why the thread 111 is not completely formed as described above is to solve the problem that the couplers 110 are not coupled because the pitch of the thread 111 is not matched due to different distances between the joints of the reinforcing bars when the couplers 110 are seated as if they are wrapped with each other.

Meanwhile, Korean Patent Application Publication No. 10-2011-0017551 discloses a compression coupler for connection of rebar, which includes a pair of fastening segments 20 and 21 pressed against the outer peripheral surfaces of reinforcing bars 10 and 11 while having thread members 20a and 21a formed on the respective inner peripheral surfaces thereof and tapered surfaces 22, inclined in both directions, formed on the respective outer peripheral surfaces thereof, and a pair of fastening caps 30 and 31 having tapered surfaces 32 formed on the respective inner peripheral surfaces thereof corresponding to the tapered surfaces 22 and fitted and assembled to both sides of the fastening segments 20 and 21 to face each other, as illustrated in FIG. 4.

However, the related art illustrated in FIG. 4 has the following problems.

That is, deformation (bulging) occurs such that the centers of the fastening segments 20 and 21 protrude outward when the fastening segments 20 and 21 are covered and pressed inward from both sides thereof by the fastening caps 30 and 31. Hence, it is impossible to properly couple the reinforcing bars, and to satisfy compressive and tensile strength even though the reinforcing bars are coupled to each other.

In addition, when the fastening segments 20 and 21 are seated on the outer surfaces of the reinforcing bars 10 and 11, it is difficult to position the ends of the reinforcing bars 10 and 11 accommodated therein, which may lead to deterioration in assembling work.

Besides, since the fastening segments 20 and 21 are stored in a separated state, the maintenance and management thereof may be difficult.

SUMMARY OF THE INVENTION

The present invention has been made in view of the above-mentioned problems, and an object thereof is to provide a rebar coupler that can be prevented from loosening against tensile stress and compressive stress as well as impact or vibration.

It is another object of the present invention to provide a rebar coupler that includes a plurality of segments configured to have the same shape and size and generate a binding force by pressing an outer surface of a reinforcing bar, thereby achieving a reduction in manufacturing cost and facilitating maintenance and management.

It is still another object of the present invention to provide a rebar coupler that includes a spacer for allowing a plurality of segments to be radially spaced apart from each other, thereby enabling rebar connection to be more easily performed and working time to be significantly shortened.

It is a further object of the present invention to provide a rebar coupler capable of preventing a failure in fastening in advance by arranging a plurality of segments in a spiral form to minimize their deformation (bulging) when a sleeve is pressed thereagainst.

In accordance with an aspect of the present invention, there is provided a rebar coupler that includes a plurality of segments having the same shape and radially arranged, the segments being seated on outer surfaces of a pair of reinforcing bars with ends of the reinforcing bars simultaneously accommodated therein, a spacer configured to accommodate the segments therein and support them while spacing the segments at regular intervals, and a pair of sleeves configured to press the outer surfaces of the reinforcing bars against inner peripheral surfaces of the segments by allowing the segments to be close to each other when the sleeves approach each other.

Each of the segments may have a spiral shape while having a cross-sectional area that decreases from its center to its edge.

The segment may have a higher hardness than each of the reinforcing bars and have a plurality of compression protrusions formed integrally on the inner peripheral surface thereof, and the compression protrusions may generate a binding force by penetrating and pressing the outer surface of the reinforcing bar.

The spacer may be made of synthetic resin.

The spacer may include a segment accommodation part perforated in a shape corresponding to the cross section of the center of the segment, a depth limitation part configured to limit depths of insertion of the pair of reinforcing bars by coming into contact with the ends of the reinforcing bars, and a completion display part configured to inform whether rebar connection is completed by coming into contact with the pair of sleeves.

Each of the sleeves may have a constant outer diameter while having a cross-sectional area that decreases in one direction.

The sleeve may have an inclined surface formed therein and the inclined surface may have an inclination and curvature corresponding to the outer surface of the segment.

The segment may consist of three segments having a spindle shape when the segments are spaced apart from each other by the spacer.

The sleeve may have a higher strength than each of the segments.

The spacer may have an elastic restoring force, and may generate a repulsive force when the spacer is pressed by the pair of sleeves.

A rebar coupler according to the present invention includes a plurality of segments configured to have the same shape and size and generate a binding force by pressing an outer surface of a reinforcing bar.

Thus, it is possible to reduce the manufacturing cost of the rebar coupler and facilitate the maintenance and management thereof.

In addition, it is possible to prevent the rebar coupler from loosening against tensile stress and compressive stress as well as impact or vibration.

In addition, since the rebar coupler includes a spacer for allowing the segments to be radially spaced apart from each other, it is possible to more easily perform rebar connection and shorten working time.

Furthermore, the rebar coupler can prevent a failure in fastening in advance by arranging the segments in a spiral form to minimize their deformation (bulging) when a sleeve is pressed thereagainst.

DETAILED DESCRIPTION OF THE INVENTION

Figure 1:
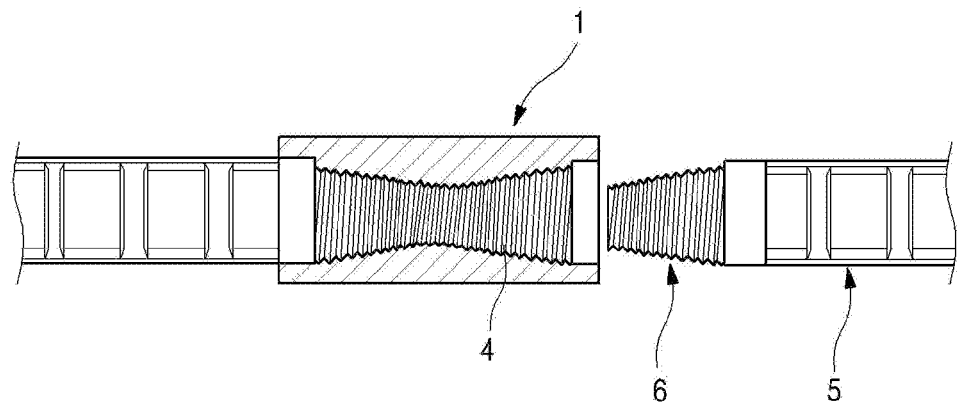
FIG. 1 is a schematic view illustrating a configuration of a conventional rebar coupler.
Figure 2:
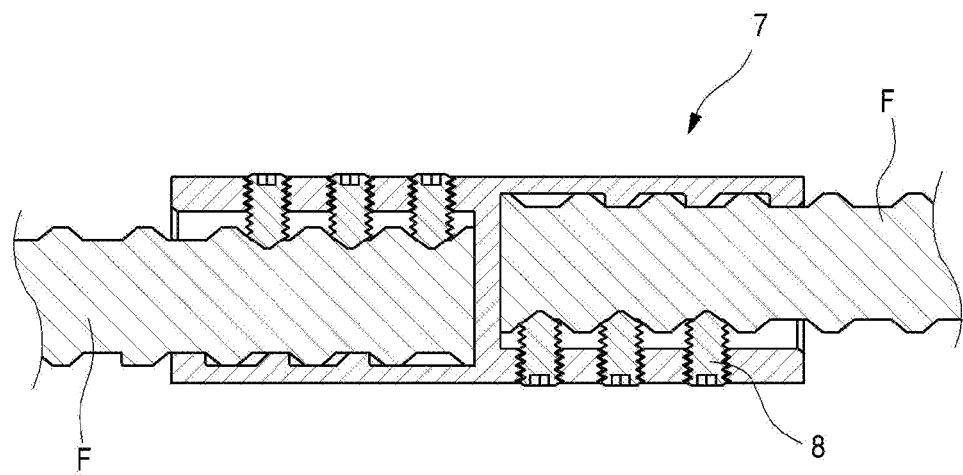
FIG. 2 is a longitudinal cross-sectional view illustrating a configuration of a rebar coupler disclosed in Korean Patent Application Publication No. 10-2010-0009774.
Figure 3:
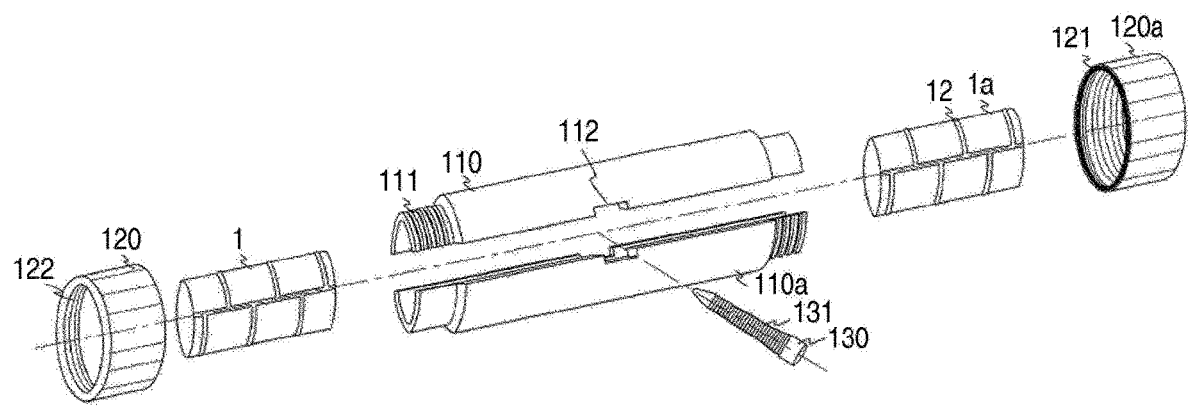
FIG. 3 is an exploded perspective view illustrating a configuration of a rebar coupling device disclosed in Korean Patent Application Publication No. 10-2004-0024686.

Hereinafter, a configuration of a rebar coupler 100 according to the present invention will be described in detail with reference to the accompanying drawings.

Prior to the description, it is noted that the terms and words used in the present specification and claims should not be construed as being limited to common or dictionary meanings but instead should be understood to have meanings and concepts in agreement with the spirit of the present invention based on the principle that an inventor can define the concept of each term suitably in order to describe his/her own invention in the best way possible.

Accordingly, since the embodiments described in the present specification and the configurations illustrated in the drawings are nothing but one preferred embodiment of the present invention and it does not cover all the technical ideas of the invention, it should be understood that various changes and modifications may be made at the time of filing the present application.

Figure 5:
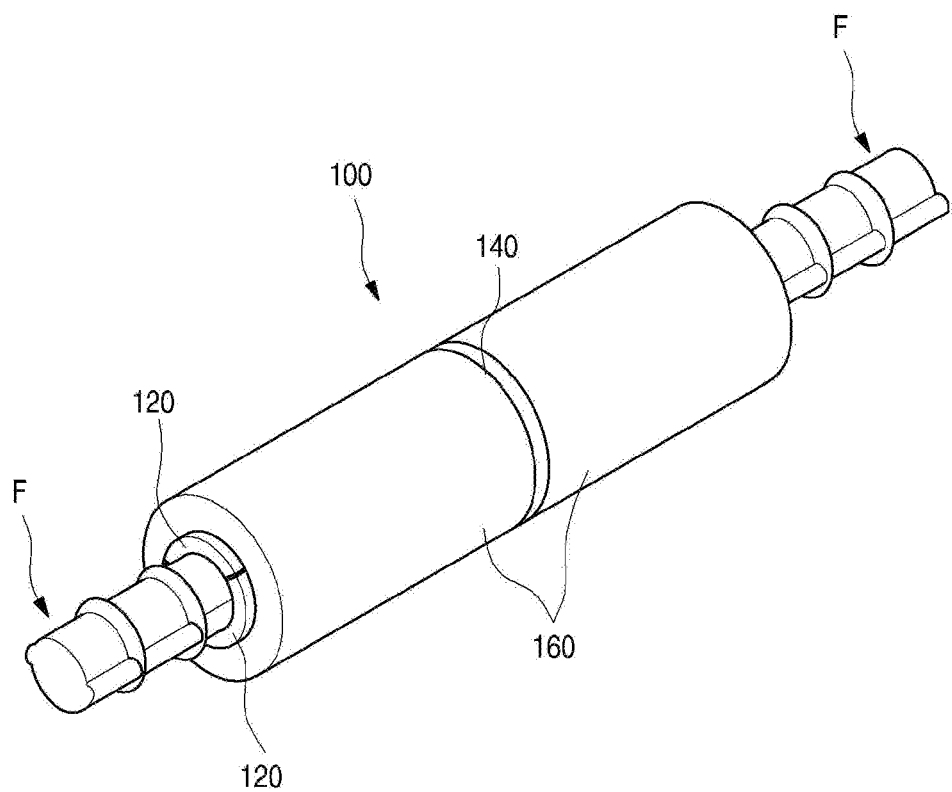
FIG. 5 is a perspective view illustrating an example of use of a rebar coupler according to the present invention.

FIG. 5 is a perspective view illustrating an example of use of a rebar coupler 100 according to the present invention.

As illustrated in the drawing, the rebar coupler 100 according to the present invention is a mechanism for connecting a pair of reinforcing bars F in a straight line shape. The rebar coupler 100 has a cylindrical shape and generates a binding force by pressing the outer surfaces of the reinforcing bars F in a state in which the reinforcing bars F approach each other so that the ends thereof are accommodated therein.

Accordingly, the rebar coupler 100 can interconnect all types of reinforcing bars F in various forms, such as deformed bars or spiral bars, and can also interconnect reinforcing bars F having different shapes in a straight line.

The rebar coupler 100 includes a plurality of segments 120 seated on the outer surfaces of a pair of reinforcing bars F, a spacer 140 for accommodating the segments 120 therein and supporting the segments 120 while spacing the segments 120 at regular intervals, and a pair of sleeves 160 for pressing the outer surfaces of the reinforcing bars F against the inner peripheral surfaces of the segments 120 by allowing the segments 120 to be close to each other when the sleeves 160 approach each other.

Hereinafter, a detailed configuration of the rebar coupler 100 will be described in detail with reference to FIG. 6.

Figure 6:
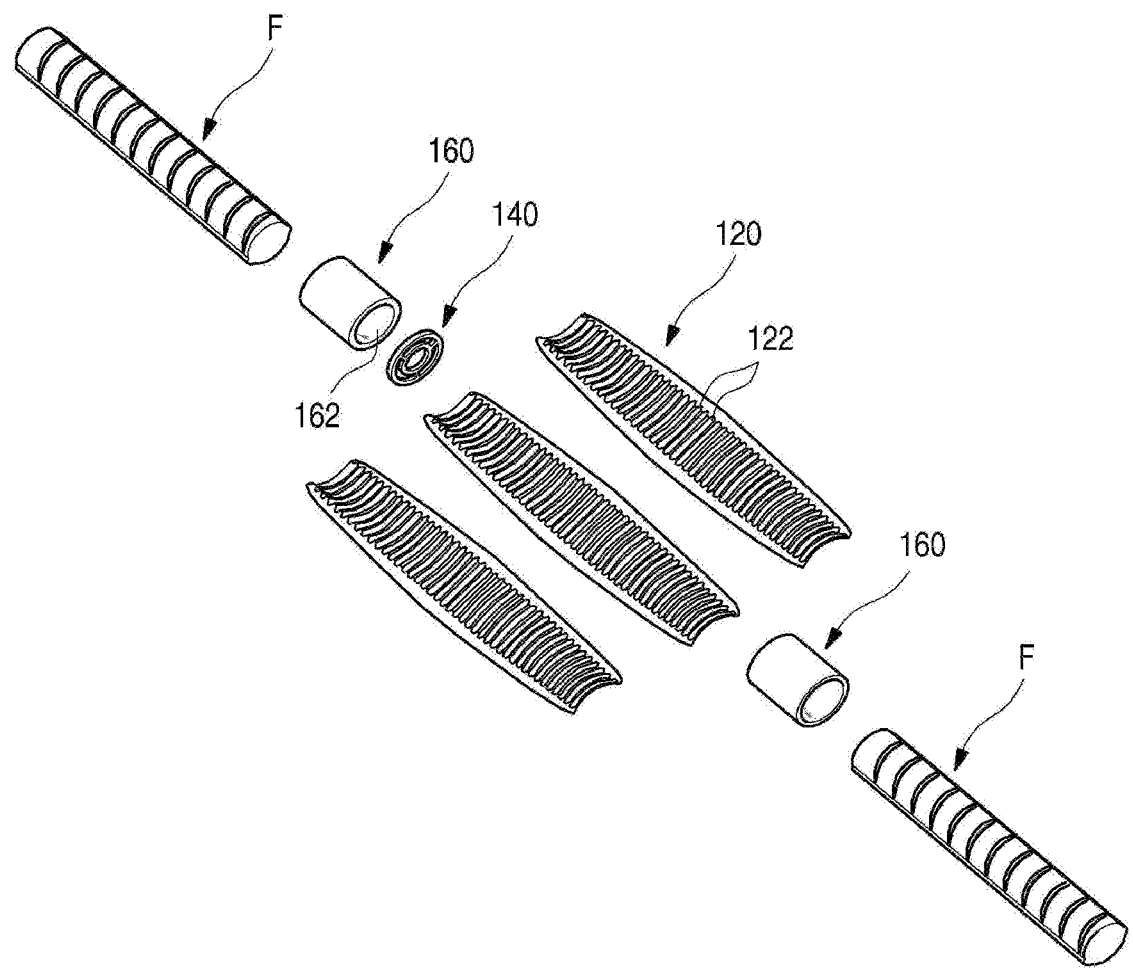
FIG. 6 is an exploded perspective view illustrating a detailed configuration of the rebar coupler according to the present invention.

FIG. 6 is an exploded perspective view illustrating the detailed configuration of the rebar coupler 100 according to the present invention.

As illustrated in FIG. 6, the rebar coupler 100 may interconnect a pair of reinforcing bars F in a straight line using three segments 120, a single spacer 140, and a pair of sleeves 160.

There are provided a plurality of segments 120 having the same size and shape. When the segments 120 are arranged radially on the outer peripheral surfaces of the reinforcing bars F to surround them, the outer surfaces of the reinforcing bars F are covered by the segments 120 except for the gap between the segments 120.

In an embodiment of the present invention, there are provided three segments 120 having the same shape and size. The three segments 120 are arranged radially at an angle of 120 degrees and seated on the outer surfaces of the reinforcing bars F.

Meanwhile, the segments 120 are a main component of the present invention and have the same shape. Each of the segments 120 has a spiral shape.

That is, the three segments 120 have a spindle shape when they are radially arranged. More specifically, each segment 120 is formed to have a spiral shape in such a manner that a spindle-shaped column is longitudinally perforated and then cut circumferentially at intervals of 120 degrees so that the cut positions are inclined rather than parallel to the center of a reinforcing bar F.

Figure 4:
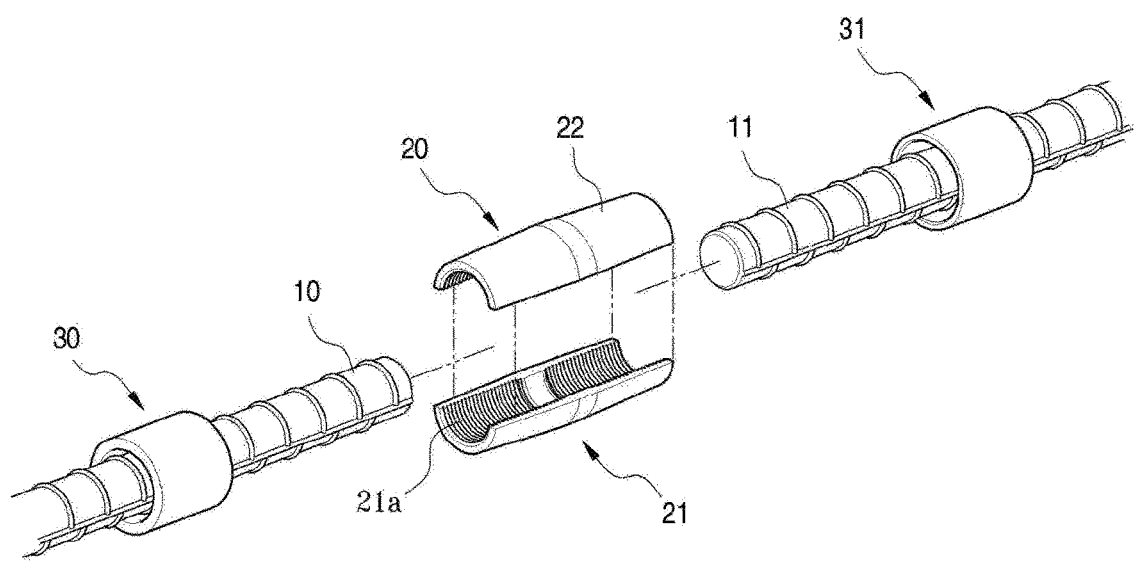
FIG. 4 is an exploded perspective view illustrating a configuration of a compression coupler for connection of rebar disclosed in Korean Patent Application Publication No. 10-2011-0017551.

This is to prevent the segments 120 seated on the outer surfaces of the reinforcing bars F from bulging outward when the segments 120 are compressed inward by the sleeves 160. If each segment 120 is parallel to the center of gravity of each reinforcing bar F as in the related art of FIG. 4, the layer on the segment 120 is pushed when the sleeves 160 approach each other as the center of the segment 120 is thick, which may lead to bulging.

In order to prevent such an issue, each segment 120 of the present invention has a spiral shape to reduce an amount of overlapping between the layers on the segments 120 by their spiral recesses spaced apart from each other even though the sleeves 160 approach and press the segments 120, which prevents the segments 120 from bulging in advance.

Accordingly, each of the segments 120 has an asymmetrical shape in left and right, forward and rearward, and upward and downward directions, and the cross-sectional area thereof decreases from its center to its edge.

The segment 120 has a higher hardness than the reinforcing bar F. Thus, compression can be performed when the segment 120 applies pressure to the outer surface of the reinforcing bar F.

Meanwhile, the segment 120 has a plurality of compression protrusions 122 formed on the inner peripheral surface thereof for increasing a binding force during compression on the outer peripheral surface of the reinforcing bar F.

The compression protrusions 122 protrude at equal intervals from the inner peripheral surface of the segment 120 and are formed integrally with the segment 120. The compression protrusions 122 function to penetrate and press the outer peripheral surface of the reinforcing bar F.

In an embodiment of the present invention, the compression protrusions 122 are formed by drilling a hole with a certain inner diameter in a spindle-shaped cylinder and then forming a thread on the inner peripheral surface of the hole. It is possible to manufacture three segments 120, each having compression protrusions 122 formed integrally therewith, by obliquely dividing a threaded spindle-shaped pipe into three parts.

The compression protrusions 122 are formed integrally with the segment 120 and configured to penetrate and press the reinforcing bar F. Therefore, it is preferable that both of the compression protrusions 122 and the segment 120 have a higher hardness than the reinforcing bar F.

There are provided a pair of sleeves 160 configured to accommodate the edges of the segments 120 therein and generate a pressure such that the segments 120 apply a compressive force to the outer surfaces of the reinforcing bars F to press them.

To this end, in an embodiment of the present invention, the sleeves 160 have the same outer diameter and the inner cross-sectional area of each of the sleeves 160 increases outward (in the left and right directions in FIG. 6).

Accordingly, the sleeve 160 has an inclined surface 162 therein when viewed from the longitudinal section thereof. The inclined surface 162 has an angle corresponding to the inclination of the outer peripheral surface of the segment 120 and has a curvature corresponding to the outer curvature of the segment 120, thereby enabling the sleeves 160 to press the segments 120 in the center direction when they approach each other.

The spacer 140 is provided in the center of the rebar coupler 100. The spacer 140 is configured to support the segments 120 while radially spacing the segments 120 apart from each other, and is made of synthetic resin to have an elastic restoring force.

Hereinafter, a detailed configuration of the spacer 140 will be described with reference to FIG. 7.

Figure 7:
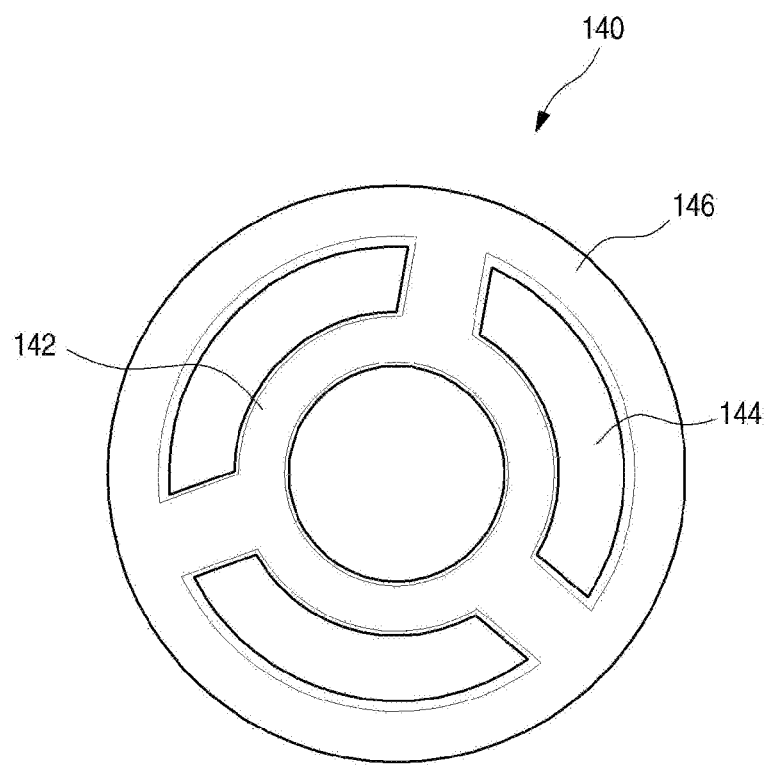
FIG. 7 is a top view illustrating an external appearance of a spacer which is one component of the rebar coupler according to the present invention.

FIG. 7 is a top view illustrating an external appearance of the spacer 140 which is one component of the rebar coupler 100 according to the present invention.

As illustrated in the drawing, the spacer 140 has a disk shape that has a plurality of holes formed therein. The spacer 140 has a depth limitation part 142 provided at the center thereof.

The depth limitation part 142 serves to limit the depths of insertion of the reinforcing bars F by coming into contact with the ends of the reinforcing bars F. The depth limitation part 142 has a size smaller than the outer diameter of each reinforcing bar F, and comes into contact with the ends of the reinforcing bars F at the respective front and rear surfaces thereof.

Segment accommodation parts 144 are formed outside the depth limitation part 142. The segment accommodation parts 144 are formed by drilling three holes radially with respect to the center of the spacer 140, and each have a shape and size corresponding to the longitudinal cross section of the center of the associated segment 120.

When the three segments 120 are inserted into the segment accommodation parts 144, the segment accommodation parts 144 are positioned at the respective centers of the segments 120 to generate a frictional force, thereby enabling the segments 120 to be supported in a state in which the segments 120 are spaced apart from each other by the distance of separation of the segment accommodation parts 144.

The segment accommodation parts 144 are spaced at an angle of 120 degrees so that the three segments 120 may be kept spaced at equal intervals.

A completion display part 146 is provided outside the segment accommodation parts 144. The completion display part 146 is a part exposed to the outside as illustrated in FIG. 5 when the reinforcing bars F are interconnected by the rebar coupler 100. The completion display part 146 has a predetermined width to come into contact with the ends of the sleeves 160 and is circular in shape.

Hereinafter, a process of interconnecting the pair of reinforcing bars F using the rebar coupler 100 having the above-mentioned configuration will be described.

Figure 8:
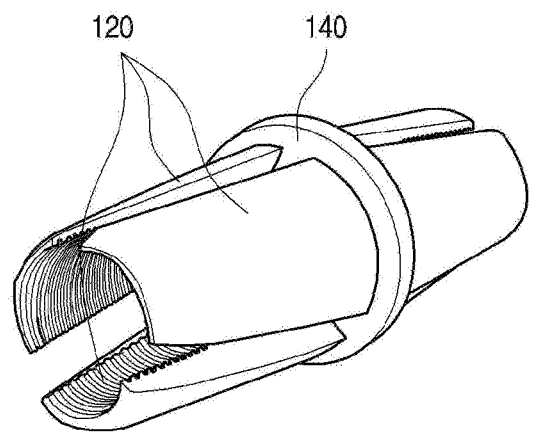
FIG. 8 is a perspective view illustrating a state in which segments, which are a main component of the rebar coupler according to the present invention, are spaced apart from each other by the spacer.

First, when the three segments 120, the spacer 140, the pair of sleeves 160, and the pair of reinforcing bars F to be interconnected are prepared as illustrated in FIG. 6, the spacer 140 and the segments 120 are temporarily assembled as illustrated in FIG. 8.

That is, after the centers of the segments 120 are inserted into the segment accommodation parts 144, the segments 120 are temporarily assembled to the spacer 140 so as to be supported while being spaced apart from each other by the spacer 140, as illustrated in FIG. 8.

Figure 9:
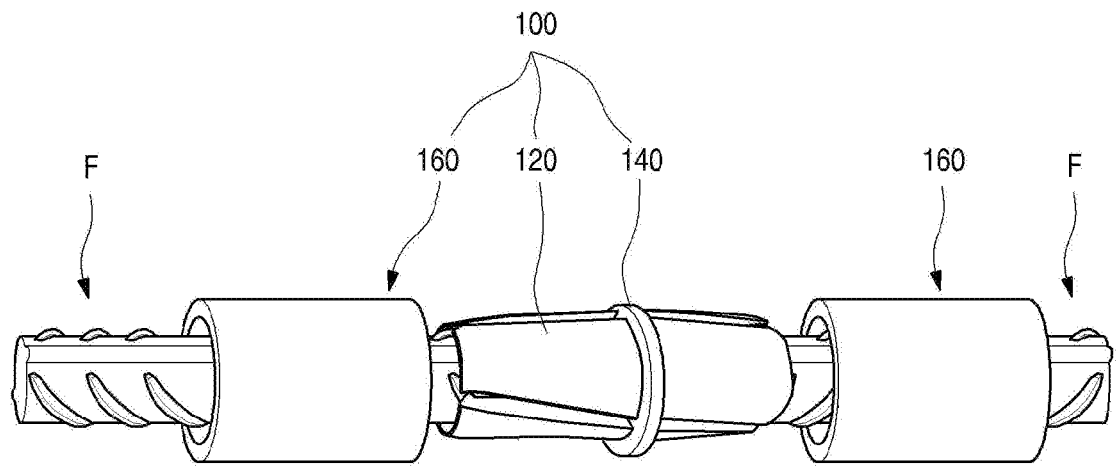
FIG. 9 is a perspective view illustrating a state in which the segments are seated on outer surfaces of reinforcing bars in the rebar coupler according to the present invention.

Next, the respective reinforcing bars F are inserted through the left and right sides of the segments 120 as illustrated in FIG. 9 and the sleeves 160 are fitted and positioned on the outer sides of the reinforcing bars F.

FIG. 9 is a perspective view illustrating a state in which the segments 120 are seated on outer surfaces of reinforcing bars F in the rebar coupler 100 according to the present invention. Since the reinforcing bars F each have a relatively long length, the ends of the reinforcing bars F are inserted into the segments 120 with the sleeves 160 previously fitted on the reinforcing bars F.

In this case, the segments 120 are kept spaced apart from each other by the spacer 140, and may be moved by a predetermined range in a direction away from each other with the aid of the elastic restoring force of the spacer 140.

Figure 10:
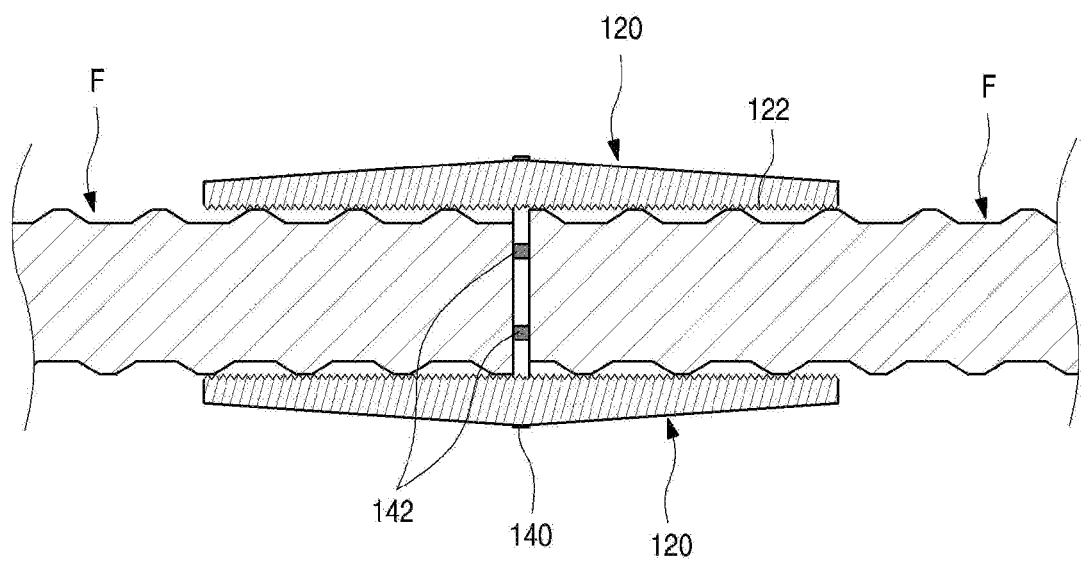
FIG. 10 is a longitudinal cross-sectional view illustrating a state in which the segments are seated on the outer surfaces of the reinforcing bars in the rebar coupler according to the present invention.

Thus, the reinforcing bars F can be inserted into the segments 120 and the segments 120 are seated on the outer peripheral surfaces of the inserted reinforcing bars F as illustrated in FIG. 10.

More specifically, the compression protrusions 122 of the segments 120 are in contact with the outer surfaces of the reinforcing bars F and the ends of the reinforcing bars F come into contact with the depth limitation part 142, so that the reinforcing bars F cannot be inserted any more.

Figure 11:
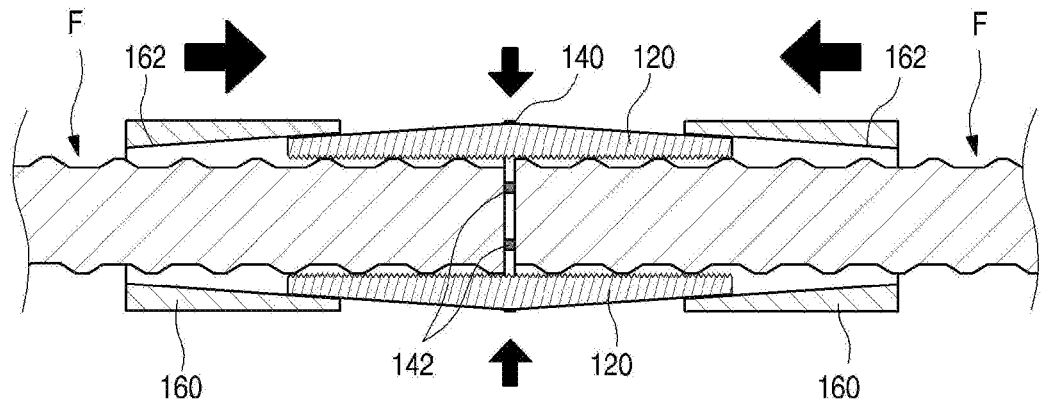
FIG. 11 is a schematic view illustrating an operation of the segments when sleeves approach each other in the rebar coupler according to the present invention.

Next, the sleeves 160 approach each other by the pressure applied thereto in opposite directions as illustrated in FIG. 11.

The pressure applied to the sleeves 160 may be provided as various pressures such as hydraulic pressure or air pressure. A dedicated tool may also be used that is designed to provide a pressure only at the ends of the sleeves 160 without interfering with the outer surfaces of the reinforcing bars F.

Both ends of each of the segments 120 are accommodated into the sleeves 160 by the pressure applied to the outer ends of the sleeves 160 and the inclined outer surfaces of the segments 120 come into surface contact with the inclined surfaces 162 of the sleeves 160, so that the segments 120 move in the center direction (in the vertical direction indicated by the central arrows of FIG. 11).

Figure 12:
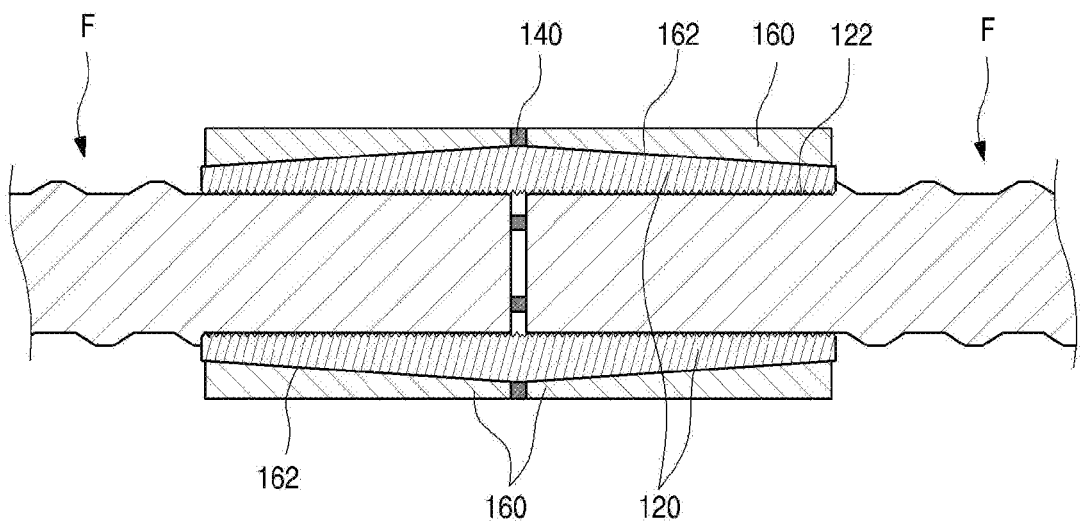
FIG. 12 is a longitudinal cross-sectional view illustrating a state in which the reinforcing bars are interconnected by the rebar coupler according to the present invention.

As the sleeves 160 approach each other, the segments 120 are ultimately moved close to each other to tighten the outer surfaces of the reinforcing bars F while the compression protrusions 122 push and press the outer surfaces of the reinforcing bars F, as illustrated in FIG. 12.

In this case, the segments 120 are arranged in a spiral form on the outer surfaces of the reinforcing bars F. Therefore, it is possible to prevent the bulging of the segments 120 even though the segments 120 are moved in the center direction by the force applied to the left and right sides thereof due to the movement of the sleeves 160, and to exhibit a stress dispersion effect.

It may be determined that the interconnection of the reinforcing bars F is completed when the ends of the respective sleeves 160 approaching each other are further advanced after coming into contact with the completion display part 146.

That is, when the sleeves 160 approach each other and deform the spacer 140, the spacer 140 generates an elastic restoring force to generate a repulsive force for pushing the sleeves 160 in opposite directions, in which state the interconnection of the reinforcing bars F is completed.

Accordingly, the completion of the interconnection of the reinforcing bars F can be checked with the naked eyes from the state in which the completion display part 146 of the spacer 140 is smaller than its original width and protrudes out of the sleeves 160. The repulsive force generated by the spacer 140 enables the rebar coupler to be prevented from loosening due to the impact load or vibration applied to the reinforcing bars F or the like.

The scope of the present invention is not limited to the above-mentioned embodiments, and many other modifications based on the present invention will be possible to those skilled in the art within the technical scope of the present invention.

For example, although the segments 120 are illustrated as pressing the reinforcing bars F by the inclined surfaces 162 of the sleeves 160 in the embodiment of present invention, the sleeves 160 may of course be configured to have a higher hardness than the segments 120 so that the segments 120 are extruded during movement of the sleeves 160 to fill the curved outer surfaces of the reinforcing bars F with the layers on the segments 120 and simultaneously press them by the compression protrusions 122.

In addition, although the three segments 120 are provided in the embodiment of the present invention, two or four or more segments having the same shape may of course be provided as long as they are seated on the outer surfaces of the reinforcing bars F in a spiral form.

A rebar coupler according to the present invention is prevented from loosening against tensile stress and compressive stress as well as impact or vibration.

Therefore, the rebar coupler can exhibit sufficient durability even in a large structure, and can be usefully applied to seismic design.

In addition, since rebar connection is easily performed, it is possible to temporarily assemble a plurality of reinforced structures on the ground and then lift them up to finally interconnect them, and to rapidly construct complicated structures.

What is claimed is:

1. A rebar coupler comprising:
    a plurality of elongate segments having the same shape and radially arranged, the segments configured to be seated on outer surfaces of a pair of reinforcing bars with ends of the reinforcing bars simultaneously accommodated therein for coupling thereto, each of the segments having a longitudinally split spindle shape of polygonal shape with a cross-sectional area decreasing from its central area toward its opposite terminal areas of the segments when viewed radially outwardly from a central axis of the rebar coupler;
    a spacer configured to accommodate the segments therein, the spacer including a plurality of segment accommodation openings, each opening formed through an entire length of the spacer, the segment accommodation openings being shaped to receive the segments therethrough and support the central area of the segments while spacing the segments at regular intervals; and
    a pair of sleeves configured to press the outer surfaces of the segments inwardly to securely hold the outer surfaces of the reinforcing bars, when the sleeves are forced to press and move in a longitudinal direction toward each other,
    wherein the plurality of segments are configured to be radially arranged to form a spindle shape as a whole with the segments inserted through the segment accommodation openings of the spacer and to respectively form a spiral or inclined shape with its longitudinally split side edges inclined relative to a longitudinal center of the reinforcing bar.

2. The rebar coupler according to claim 1, wherein the segment has a higher hardness than each of the reinforcing bars and has a plurality of compression protrusions formed integrally on the inner peripheral surface thereof, and the compression protrusions generate a binding force by penetrating and pressing the outer surface of the reinforcing bar.

3. The rebar coupler according to claim 2, wherein the spacer is made of synthetic resin.

4. The rebar coupler according to claim 1, wherein the spacer comprises:
    a depth limitation part configured to limit depths of insertion of the pair of reinforcing bars by coming into contact with the ends of the reinforcing bars; and
    a completion display part configured to inform whether rebar connection is completed by coming into contact with the pair of sleeves.

5. The rebar coupler according to claim 4, wherein each of the sleeves has a constant outer diameter while having a cross-sectional area that decreases in one direction.

6. The rebar coupler according to claim 5, wherein the sleeve has an inclined inner surface formed therein and the inclined inner surface has an inclination and curvature corresponding to the outer surface of the segment.

7. The rebar coupler according to claim 1, wherein the segments consist of three segments having the spindle shape as a whole when the segments are spaced apart from each other by the spacer.

8. The rebar coupler according to claim 7, wherein the sleeve has a higher strength than each of the segments.

9. The rebar coupler according to claim 8, wherein the spacer has an elastic restoring force, and generates a repulsive force when the spacer is pressed by the pair of sleeves.

* * * * *